G. HARMAN.
CARRIERS FOR LATHE WORK.
No. 190,137. Patented May 1, 1877.
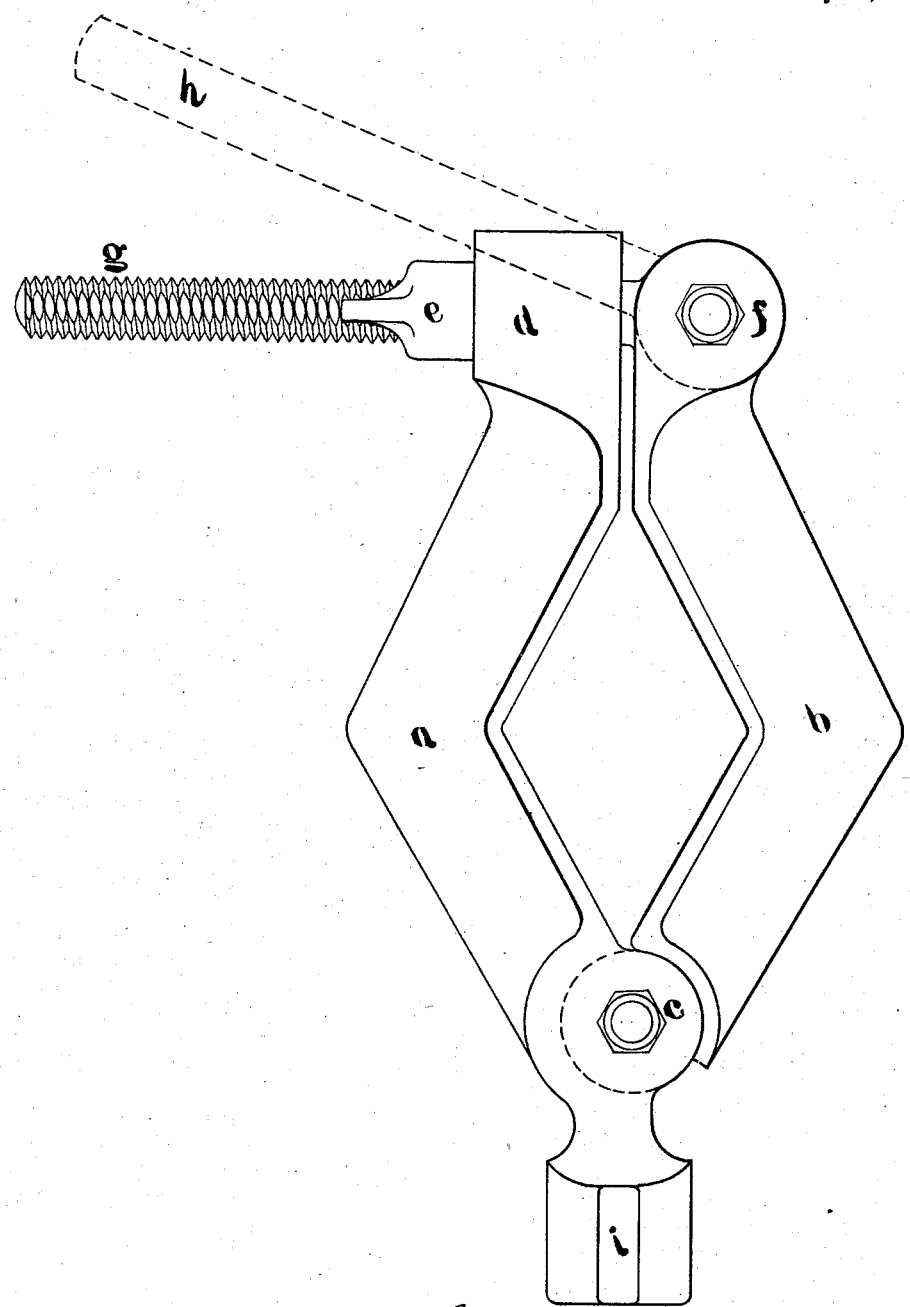

UNITED STATES PATENT OFFICE.

GOTTLEIB HARMAN, OF PHILADELPHIA, PENNSYLVANIA.

IMPROVEMENT IN CARRIERS FOR LATHE-WORK.

Specification forming part of Letters Patent No. 190,137, dated May 1, 1877; application filed April 2, 1877.

*To all whom it may concern:*

Be it known that I, GOTTLEIB HARMAN, of the city and county of Philadelphia, Pennsylvania, have invented a new and Improved Carrier for Lathe-Work; and I hereby declare the following to be a full, clear, and exact description of the same, reference being had to the accompanying drawing, and to the letters of reference marked thereon.

My invention consists in the construction and arrangement of a carrier with a hinged joint and hinged clamp-screw, in the manner and for the purpose as hereinafter described.

The object of the invention is to enable the ready attachment and detachment to shafting while in or out of the lathe, as hereinafter described.

In order to enable others to use and practice my invention, I will proceed to describe its construction and operation.

On reference to the accompanying drawings, which form part of this specification, the sketch represents a face view of the carrier, of which—

$a$ is the main arm, with its chuck-prong $i$ at one end, and is slotted at $d$ for the reception and swinging out of clamp-screw $g$. Said clamp-screw $g$ is hinged to swinging arm $b$ at $f$, and is provided with nut $e$. The swinging arm $b$ is hinged to main arm at $c$.

When nut $e$ is turned to free screw $g$ from any clamping action, the screw may be thrust out in the direction of, and beyond, the dotted line $h$, which enables the carrier-arms $a$ and $b$ to be thrust apart, swinging on hinge-joint $c$, for the reception of any shaft or other similar object of capacity of carrier, after which the arms $a$ and $b$ are brought together, and screw $g$ is placed in position shown, when nut $e$ is turned to clamp the arms tightly, when the carrier is ready to propel the shaft when forced by ordinary lathe.

It will be observed that this method of constructing carriers enables a rapid and secure method of applying carrier to shafting without disturbing the shaft from its center in lathe.

What I claim, and desire to secure by Letters Patent, is—

The combination of arms $a$ and $b$ with screw $g$ and nut $e$, when arranged in the manner described, for the purpose set forth.

GOTTLEIB HARMAN.

Witnesses:
WM. B. HUGHES,
WM. GARWOOD.